United States Patent
Ma et al.

(10) Patent No.: US 12,212,705 B2
(45) Date of Patent: Jan. 28, 2025

(54) CONTROLLING AN AUGMENTED CALL BASED ON USER GAZE

(71) Applicant: Meta Platforms Technologies, LLC, Menlo Park, CA (US)

(72) Inventors: Jing Ma, Mill Creek, WA (US); Paul Armistead Hoover, Bothell, WA (US); Joshuah Vincent, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 405 days.

(21) Appl. No.: 17/840,725

(22) Filed: Jun. 15, 2022

(65) Prior Publication Data

US 2023/0412724 A1    Dec. 21, 2023

(51) Int. Cl.
*H04M 1/72454* (2021.01)
*G02B 27/00* (2006.01)
(Continued)

(52) U.S. Cl.
CPC .... *H04M 1/72454* (2021.01); *G02B 27/0093* (2013.01); *G02B 27/0103* (2013.01);
(Continued)

(58) Field of Classification Search
CPC ............. H04M 1/72454; H04M 1/05; H04M 1/724097; G02B 27/0093; G02B 27/0103;
(Continued)

(56) References Cited

U.S. PATENT DOCUMENTS

| 6,559,863 B1 | 5/2003 | Megiddo |
| 8,537,196 B2 | 9/2013 | Hegde et al. |

(Continued)

FOREIGN PATENT DOCUMENTS

| CA | 3039347 A1 | 4/2018 |
| WO | 2020117657 A1 | 6/2020 |

OTHER PUBLICATIONS

International Search Report and Written Opinion for International Application No. PCT/US2023/012192, mailed May 4, 2023, 8 pages.

(Continued)

*Primary Examiner* — Kabir A Timory
(74) *Attorney, Agent, or Firm* — Potomac Law Group, PLLC; Dannon G. Allbee

(57) ABSTRACT

Aspects of the present disclosure are directed to controlling a sending side of an augmented call based on a receiving user's gaze. Some implementations provide a hologram moderation system in which a receiving user's gaze can control how the system generates a representation of a sending user on a sending side. For example, some implementations can moderate the capture or generation of hologram data representing the sending user when the receiving user isn't focused on the hologram that results from the data. Such moderations can reduce power consumption, bandwidth, heat production, and/or processing power needed by the artificial reality system when the receiving user is not looking at the hologram of the sending user, such as when the sending user is in the receiving user's periphery or outside the receiving user's field-of-view.

20 Claims, 12 Drawing Sheets

(51) Int. Cl.
*G02B 27/01* (2006.01)
*G06F 3/01* (2006.01)
*G06N 20/00* (2019.01)

(52) U.S. Cl.
CPC ......... *G02B 27/0172* (2013.01); *G06F 3/013* (2013.01); *G06N 20/00* (2019.01); *G02B 2027/0138* (2013.01); *G02B 2027/014* (2013.01); *G02B 2027/0174* (2013.01)

(58) Field of Classification Search
CPC ........ G02B 27/0172; G02B 2027/0138; G02B 2027/014; G02B 2027/0174; G06F 3/013; G06F 3/011; G06N 20/00; H04L 65/403; H04L 65/80; H04N 7/157
See application file for complete search history.

(56) References Cited

U.S. PATENT DOCUMENTS

| | | | |
|---|---|---|---|
| 8,581,958 | B2 | 11/2013 | Baker et al. |
| 8,675,067 | B2 | 3/2014 | Chou et al. |
| 9,338,404 | B1 | 5/2016 | Egeler et al. |
| 9,401,095 | B2 | 7/2016 | Kubota et al. |
| 9,460,340 | B2 | 10/2016 | Kauffmann et al. |
| 9,841,814 | B1 | 12/2017 | Kallmeyer et al. |
| 9,959,676 | B2 | 5/2018 | Barzuza et al. |
| 10,182,210 | B1 | 1/2019 | Goetzinger, Jr. |
| 10,212,428 | B2 * | 2/2019 | Trepte ............... G06T 15/04 |
| 10,298,587 | B2 | 5/2019 | Hook et al. |
| 10,311,383 | B2 | 6/2019 | Holmes et al. |
| 10,403,050 | B1 | 9/2019 | Beall et al. |
| 10,499,033 | B2 | 12/2019 | Pesonen |
| 10,554,931 | B1 | 2/2020 | Zavesky et al. |
| 10,582,191 | B1 | 3/2020 | Marchak, Jr |
| 10,664,772 | B1 | 5/2020 | Poel et al. |
| 10,701,318 | B2 | 6/2020 | Valli |
| 10,917,613 | B1 | 2/2021 | Chiarella et al. |
| 10,952,006 | B1 | 3/2021 | Krol et al. |
| 11,140,361 | B1 | 10/2021 | Krol et al. |
| 11,302,063 | B2 * | 4/2022 | Cabral ............... G06F 3/165 |
| 11,302,085 | B2 | 4/2022 | LeBeau et al. |
| 11,394,925 | B1 | 7/2022 | Faulkner et al. |
| 11,456,887 | B1 | 9/2022 | McCracken et al. |
| 11,528,312 | B2 | 12/2022 | Oyman |
| 11,563,779 | B2 | 1/2023 | Copley et al. |
| 2002/0158873 | A1 | 10/2002 | Williamson |
| 2007/0279484 | A1 | 12/2007 | Derocher et al. |
| 2009/0288007 | A1 | 11/2009 | Leacock et al. |
| 2009/0300516 | A1 | 12/2009 | Jerrard-Dunne et al. |
| 2010/0085416 | A1 | 4/2010 | Hegde et al. |
| 2011/0107270 | A1 | 5/2011 | Wang et al. |
| 2012/0192088 | A1 | 7/2012 | Sauriol et al. |
| 2012/0204118 | A1 | 8/2012 | Lefar et al. |
| 2012/0246582 | A1 | 9/2012 | Leacock et al. |
| 2012/0317501 | A1 | 12/2012 | Milou |
| 2013/0024785 | A1 | 1/2013 | Van Wie |
| 2013/0031475 | A1 | 1/2013 | Maor et al. |
| 2014/0085316 | A1 | 3/2014 | Narayanan |
| 2014/0085406 | A1 | 3/2014 | Narayanan |
| 2014/0096036 | A1 | 4/2014 | Mohler |
| 2015/0215581 | A1 | 7/2015 | Barzuza et al. |
| 2015/0271220 | A1 | 9/2015 | Kleiner et al. |
| 2015/0279044 | A1 | 10/2015 | Kim et al. |
| 2016/0050394 | A1 | 2/2016 | Segal |
| 2016/0093108 | A1 | 3/2016 | Mao et al. |
| 2016/0132221 | A1 | 5/2016 | Lasser et al. |
| 2016/0155187 | A1 | 6/2016 | Paulrajan et al. |
| 2016/0156584 | A1 | 6/2016 | Hum et al. |
| 2016/0163070 | A1 | 6/2016 | Leacock et al. |
| 2016/0353062 | A1 | 12/2016 | Ono et al. |
| 2017/0257405 | A1 | 9/2017 | Lo et al. |
| 2017/0357917 | A1 | 12/2017 | Holmes et al. |
| 2018/0063480 | A1 | 3/2018 | Luks et al. |
| 2018/0095635 | A1 | 4/2018 | Valdivia et al. |
| 2018/0098059 | A1 | 4/2018 | Valdivia et al. |
| 2018/0101989 | A1 | 4/2018 | Frueh et al. |
| 2018/0139246 | A1 | 5/2018 | Rosenberg |
| 2018/0144212 | A1 | 5/2018 | Burgos et al. |
| 2018/0158246 | A1 | 6/2018 | Grau et al. |
| 2018/0227138 | A1 | 8/2018 | Faulkner et al. |
| 2018/0234671 | A1 | 8/2018 | Yang et al. |
| 2018/0356885 | A1 | 12/2018 | Ross et al. |
| 2019/0042640 | A1 | 2/2019 | Valeski |
| 2019/0045157 | A1 | 2/2019 | Venshtain et al. |
| 2019/0058870 | A1 | 2/2019 | Rowell et al. |
| 2019/0130629 | A1 | 5/2019 | Chand et al. |
| 2019/0171354 | A1 | 6/2019 | Dascola et al. |
| 2019/0253667 | A1 | 8/2019 | Valli |
| 2019/0279424 | A1 | 9/2019 | Clausen et al. |
| 2019/0310757 | A1 | 10/2019 | Lee et al. |
| 2019/0325658 | A1 | 10/2019 | Park et al. |
| 2019/0327392 | A1 | 10/2019 | Sarkar |
| 2019/0340828 | A1 | 11/2019 | Harvey |
| 2019/0346522 | A1 | 11/2019 | Botnar et al. |
| 2019/0371060 | A1 | 12/2019 | Energin et al. |
| 2019/0379750 | A1 | 12/2019 | Zamora Duran et al. |
| 2020/0090350 | A1 | 3/2020 | Cho et al. |
| 2020/0099891 | A1 | 3/2020 | Valli et al. |
| 2020/0118342 | A1 | 4/2020 | Varshney et al. |
| 2020/0128033 | A1 | 4/2020 | Kawakita |
| 2020/0142475 | A1 | 5/2020 | Paez et al. |
| 2020/0154166 | A1 | 5/2020 | Rakshit et al. |
| 2020/0279411 | A1 | 9/2020 | Atria et al. |
| 2020/0296327 | A1 | 9/2020 | Karafin et al. |
| 2020/0329214 | A1 | 10/2020 | Ahn et al. |
| 2020/0371665 | A1 | 11/2020 | Clausen et al. |
| 2020/0396266 | A1 | 12/2020 | Goel |
| 2021/0019541 | A1 | 1/2021 | Wang et al. |
| 2021/0029326 | A1 | 1/2021 | Oyman et al. |
| 2021/0099433 | A1 | 4/2021 | Soryal et al. |
| 2021/0120066 | A1 | 4/2021 | Oyman et al. |
| 2021/0149627 | A1 | 5/2021 | Jang et al. |
| 2021/0248727 | A1 | 8/2021 | Fisher et al. |
| 2021/0263593 | A1 | 8/2021 | Lacey |
| 2021/0281802 | A1 | 9/2021 | Kirisken |
| 2021/0336784 | A1 | 10/2021 | Athlur et al. |
| 2021/0385412 | A1 | 12/2021 | Matula et al. |
| 2021/0390767 | A1 | 12/2021 | Johnson et al. |
| 2021/0392175 | A1 | 12/2021 | Gronau et al. |
| 2021/0392296 | A1 | 12/2021 | Rabinovich et al. |
| 2021/0407520 | A1 | 12/2021 | Neckermann et al. |
| 2022/0084288 | A1 | 3/2022 | LeBeau et al. |
| 2022/0086167 | A1 | 3/2022 | LeBeau et al. |
| 2022/0086205 | A1 | 3/2022 | LeBeau et al. |
| 2022/0103386 | A1 | 3/2022 | Jensen |
| 2022/0109810 | A1 | 4/2022 | Kancharlawar et al. |
| 2022/0116431 | A1 | 4/2022 | Mayfield et al. |
| 2022/0150083 | A1 | 5/2022 | Faulkner |
| 2022/0157342 | A1 | 5/2022 | Kliushkin et al. |
| 2022/0172444 | A1 | 6/2022 | Lebeau et al. |
| 2022/0174108 | A1 | 6/2022 | Oyman |
| 2022/0200979 | A1 | 6/2022 | Wenzel |
| 2022/0229535 | A1 | 7/2022 | Evangelista et al. |
| 2022/0385490 | A1 | 12/2022 | Lin et al. |
| 2022/0417308 | A1 | 12/2022 | Oyman |
| 2023/0082461 | A1 | 3/2023 | Gal et al. |
| 2023/0198745 | A1 | 6/2023 | Vansteenkiste et al. |

OTHER PUBLICATIONS

Jikadra R., et al., "Video Calling with Augmented Reality Using WebRTC API," 2019 6th International Conference on Computing for Sustainable Global Development (INDIACom), Mar. 13, 2019, 5 pages.

Shanmugam M., et al., "Research Opportunities on Virtual Reality and Augmented Reality: A Survey," 2019 IEEE International Conference on System, Computation, Automation and Networking (ICSCAN), Mar. 29, 2019, 6 pages.

Baxter D.B., "Creating Treemap Chart Using JavaScript," AnyChart News, Aug. 1, 2019, 12 Pages.

EBook Reader, "Viewing Popular Highlights on Kindles," [Online], Feb. 15, 2018 [Retrieved on Aug. 5, 2020], 11 Pages, Retrieved

(56) References Cited

OTHER PUBLICATIONS from Internet: URL: https://blog.the-ebook-reader.com/2018/02/15/viewing-popular-highlights-on-kindles/.

Garofalakis J., et al., "Personalized Web Search by Constructing Semantic Clusters of User Profiles," Springer Link [Online], 2008 [Retrieved on Aug. 5, 2020], 6 Pages, Retrieved on Internet: URL: https://link.springer.com/chapter/10.1007/978-3-540-85565-1_30.

Gauch S., et al., "Ontology-Based User Profiles for Search and Browsing," [Online], 2002 [Retrieved on Aug. 5, 2020], 6 Pages, Retrieved from Internet: URL: https://www.semanticscholar.org/paper/Ontology-Based-User-Profiles-for-Search-and-Gauch-Chaffee/93af7304757a9beabb10bfbca55b04045bf2ef90.

International Preliminary Report on Patentability for International Application No. PCT/US2022/042452, mailed Mar. 14, 2024, 6 pages.

"Pinterest Communities What are they and How can you Join?," Ivory Mix, Aug. 5, 2020, 19 Pages, Retrieved from Internet: URL: https://ivorymix.com/pinterest-communities/.

Schmeiser L., "Microsoft Analytics Aims to Analyze Worker Habits, Point to More Productivity," [Online], Jul. 5, 2017 [Retrieved on Aug. 5, 2020], 3 Pages, Retrieved from Internet: URL: https://www.itprotoday.com/office-365/microsoft-analytics-aims-analyze-worker-habits-point-more-productivity.

Semantic Arts, "White Paper: Semantic Profiling," [Online], Jan. 21, 2015 [Retrieved on Aug. 5, 2020], 11 Pages, Retrieved from Internet: https://www.semanticarts.com/white-paper-semantic-profiling/.

Song X., et al., "A Scalable and Statistically Robust Beam Alignment Technique for mm-Wave Systems," May 8, 2018, 13 pages.

Tarpani G., "What is Google Wave?," Macworld [Online], Feb. 22, 2010 [Retrieved on Aug. 5, 2020], 7 Pages, Retrieved from Internet: URL: https://www.macworld.com/article/1146555/whatisgooglewave.html.

Wanders I., "Build your Own Knowledge Graph: From Unstructured Dark Data to Valuable Business Insights," Vector Consulting [Online], Oct. 18, 2018 [Retrieved on 2020-80-05], 8 Pages, Retrieved from Internet: https://medium.com/vectrconsulting/build-your-own-knowledge-graph-975cf6dde67f.

Wikipedia, The Free Encyclopedia, "Google Wave," [Online], Aug. 5, 2020, 1 Page, Retrieved from Internet: URL: https://simple.wikipedia.org/wiki/Google_Wave.

Wikipedia, The Free Encyclopedia, "Treemapping," Aug. 5, 2020, 13 Pages, Retrieved from Internet: URL: https://en.wikipedia.org/wiki/Treemapping.

Wikipedia: The Free Encyclopedia, "Unconference," Aug. 5, 2020, 3 Pages, Retrieved from Internet: URL: https://en.wikipedia.org/wiki/Unconference.

Gupta K., et al., "Do You See What I See? The Effect of Gaze Tracking on Task Space Remote Collaboration," IEEE Transactions on Visualization and Computer Graphics, Nov. 2016, vol. 22, No. 11, pp. 2413-2422, DOI: 10.1109/TVCG.2016.2593778.

International Search Report and Written Opinion for International Application No. PCT/US2021/038992, mailed Oct. 29, 2021, 16 pages.

Unknown., "A Better Way to Meet Online," Gather, https://www.gather.town/ , Last Accessed Oct. 11, 2021.

* cited by examiner

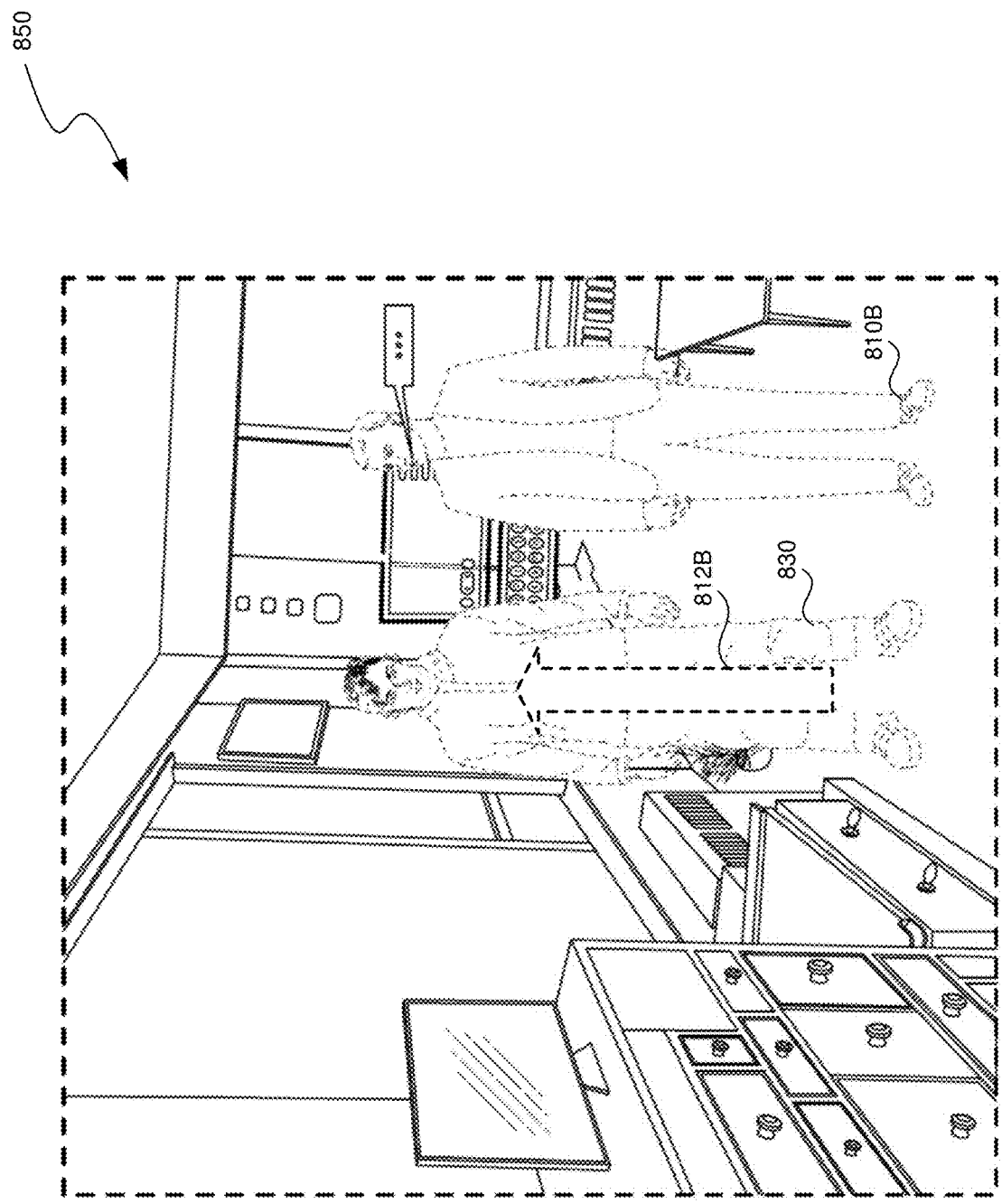

CONTROLLING AN AUGMENTED CALL BASED ON USER GAZE

TECHNICAL FIELD

The present disclosure is directed to controlling an augmented call at a sending device based on a tracked receiving user's gaze.

BACKGROUND

Video conferencing has become a major way people connect. From work calls to virtual happy hours, webinars to online theater, people feel more connected when they can see other participants, bringing them closer to an in-person experience. However, video calls remain a pale imitation of face-to-face interactions. Understanding body language and context can be difficult with only a two-dimensional ("2D") representation of a sender. Further, interpersonal interactions with video are severely limited as communication often relies on relational movements between participants.

Some artificial reality systems may provide the ability for users to engage in 3D calls, where a call participant can see a 3D representation of one or more other call participants. In such 3D calls, users can experience interactions that more closely mimic face-to-face interactions. For example, an artificial reality device can include a camera array that captures images of a sending call participant, reconstructs a hologram (3D model) representation of the sending call participant, encodes the hologram for delivery to an artificial reality device of a receiving call participant, which decodes and displays the hologram as a 3D model in the artificial reality environment of the recipient call participant.

BRIEF DESCRIPTION OF THE DRAWINGS

FIG. 8B is a conceptual diagram illustrating an example of a view from another receiving side of an augmented call when the receiving call participant's gaze is not focused on the representation of the first sending call participant in a group augmented call.

The techniques introduced here may be better understood by referring to the following Detailed Description in conjunction with the accompanying drawings, in which like reference numerals indicate identical or functionally similar elements.

DETAILED DESCRIPTION

Figure 1:
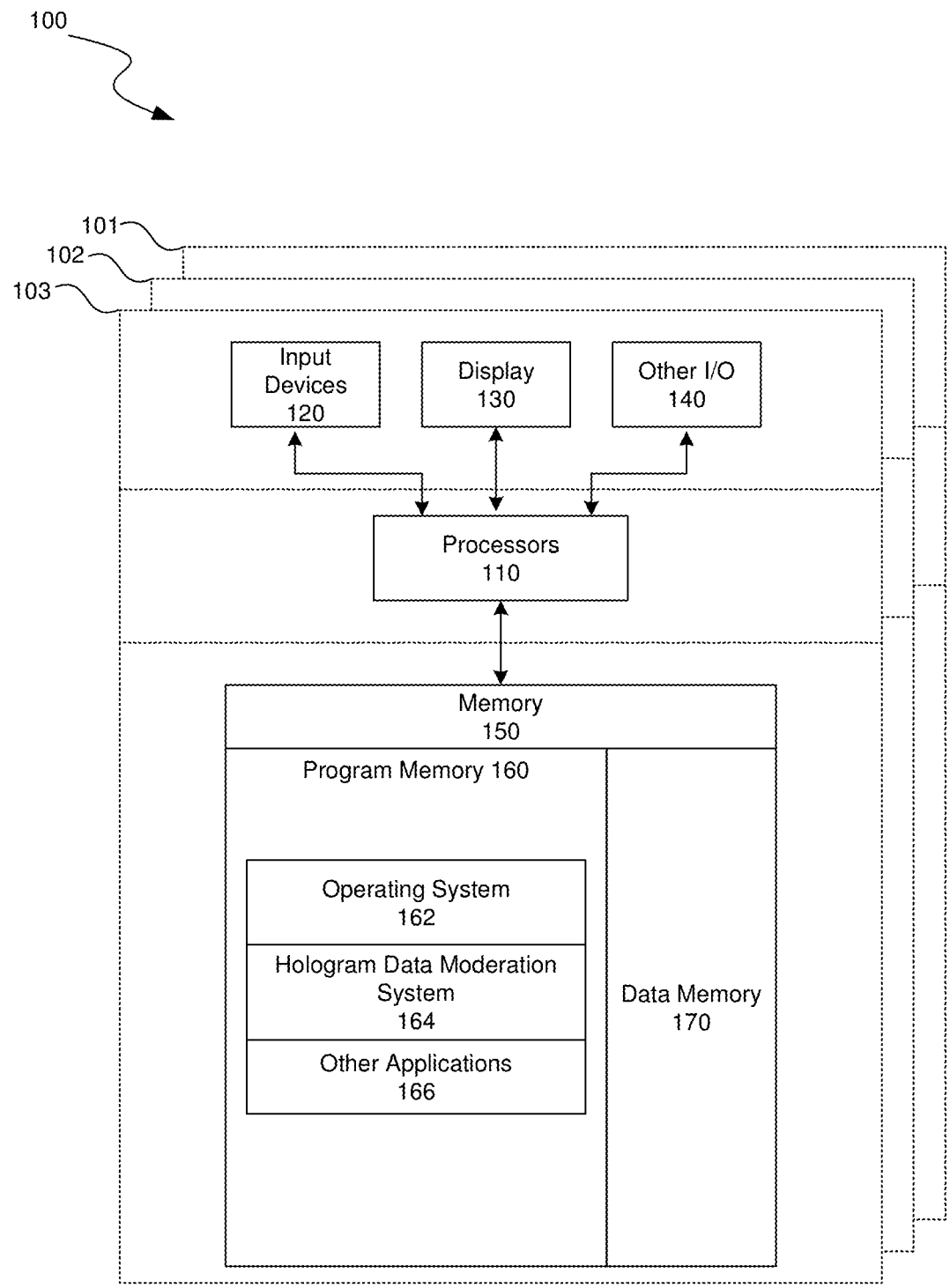
FIG. 1 is a block diagram illustrating an overview of devices on which some implementations of the present technology can operate.

Aspects of the present disclosure are directed to controlling an augmented call based on a receiving user's gaze. Because augmented calling faces numerous challenges in terms of device power consumption, bandwidth, and processing power in an artificial reality system, it is desirable to minimize the amount of resources needed in order to process the call. Thus, some implementations provide a hologram moderation system in which a receiving user's gaze can control how the system generates a representation of a sending user on a sending side of the call.

For example, some implementations can moderate the capture or generation of hologram data representing the sending user by turning off the depth capture system, reducing resolution or capture rate, turning off machine learning models, etc., when the receiving user isn't focused on the hologram that results from the data. Such moderations can reduce power consumption, heat produced, bandwidth, and/or processing power needed by the artificial reality system when the receiving user is not looking at the hologram of the sending user, such as when the sending user is in the receiving user's periphery or outside the receiving user's field-of-view. While in various cases, these moderations can reduce hologram quality—such as by flattening them, showing less detail, having them lag behind the sending user, etc., —but because the receiving user's gaze is not focused on the hologram of the sending user, the receiving user may not perceive the hologram moderation.

While described herein as a "sending side"/"sending user" and "receiving side"/"receiving user" (and the like), in some implementations, holographic calls are two-way, so each side of the call can act as both a sending side and a receiving side. The description herein of a system acting in its sending capacity captures hologram and audio data and transmits a version of it to a recipient side where it is rendered by the receiving call system. However, each call participant can be simultaneously acting in both a sending and receiving capacity.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

The implementations described herein provide a technological improvement in the field of augmented calling in XR systems. Because augmented calling traditionally captures and renders high quality three-dimensional holograms of call participants, the amount of resources consumed on both sending side and receiving side XR systems can be quite large and provide limitations with respect to the length of the call. Implementations address this problem and others by providing systems and methods that moderate, reduce, and/or conserve battery power, heat production, bandwidth, and/or processing power on XR systems. Implementations provide such moderations without significantly affecting user experience, as they are implemented selectively based on a receiving user's gaze, such that the receiving user is unaffected or even unaware of the moderations. In addition, such implementations improve the functionality of XR systems by both conserving resources and selectively increasing processing speeds when applying the moderated representations, allowing for more efficient and/or longer augmented calls.

Several implementations are discussed below in more detail in reference to the figures. FIG. 1 is a block diagram illustrating an overview of devices on which some implementations of the disclosed technology can operate. The devices can comprise hardware components of a computing system 100 that can control an augmented call based on user gaze. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

In some implementations, input from the I/O devices 140, such as cameras, depth sensors, IMU sensor, GPS units, LiDAR or other time-of-flights sensors, etc. can be used by the computing system 100 to identify and map the physical environment of the user while tracking the user's location within that environment. This simultaneous localization and mapping (SLAM) system can generate maps (e.g., topologies, girds, etc.) for an area (which may be a room, building, outdoor space, etc.) and/or obtain maps previously generated by computing system 100 or another computing system that had mapped the area. The SLAM system can track the user within the area based on factors such as GPS data, matching identified objects and structures to mapped objects and structures, monitoring acceleration and other position changes, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, hologram data moderation system 164, and other application programs 166. Memory 150 can also include data memory 170 that can include, e.g., hologram data, moderation data, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
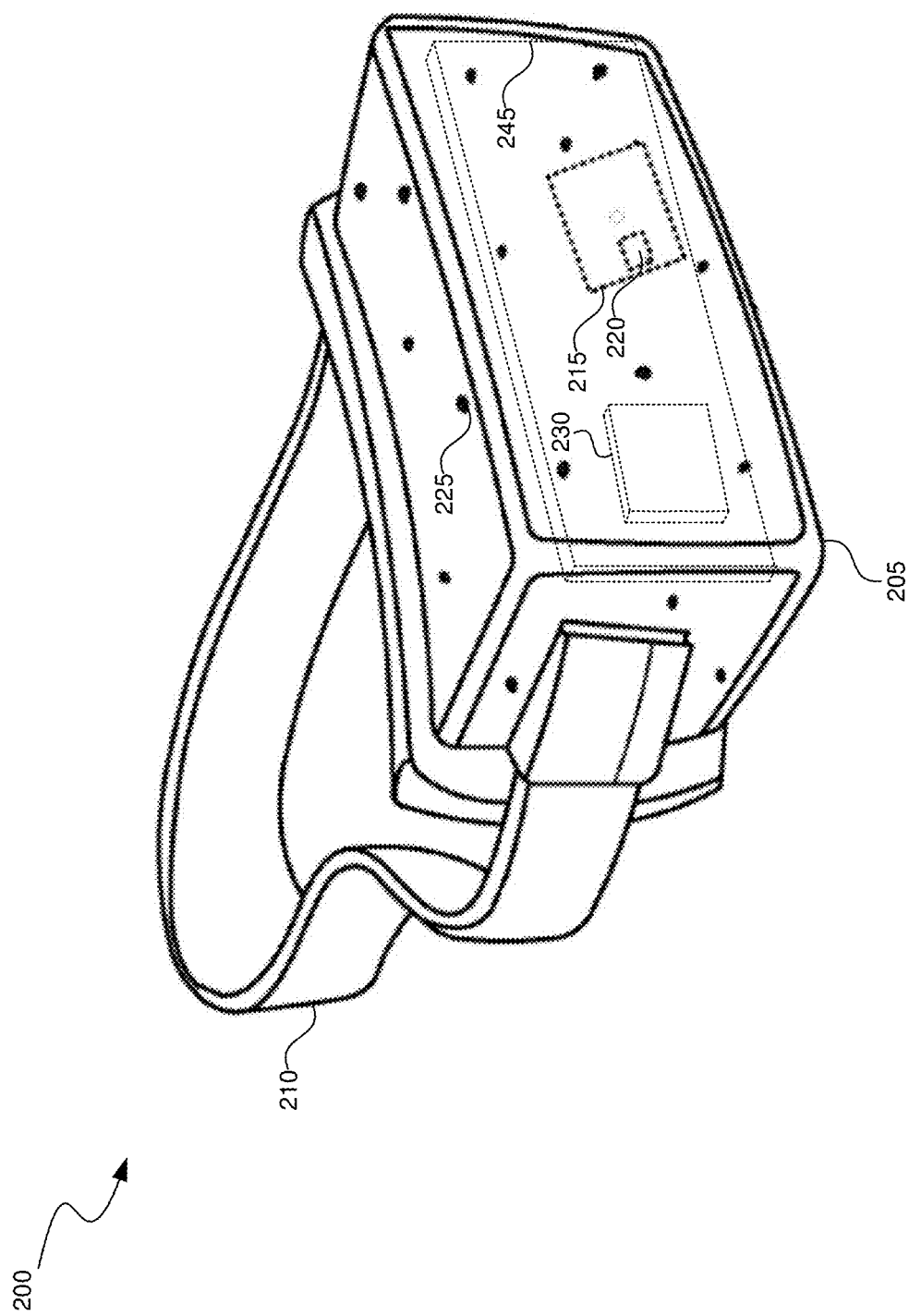
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in an artificial reality environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
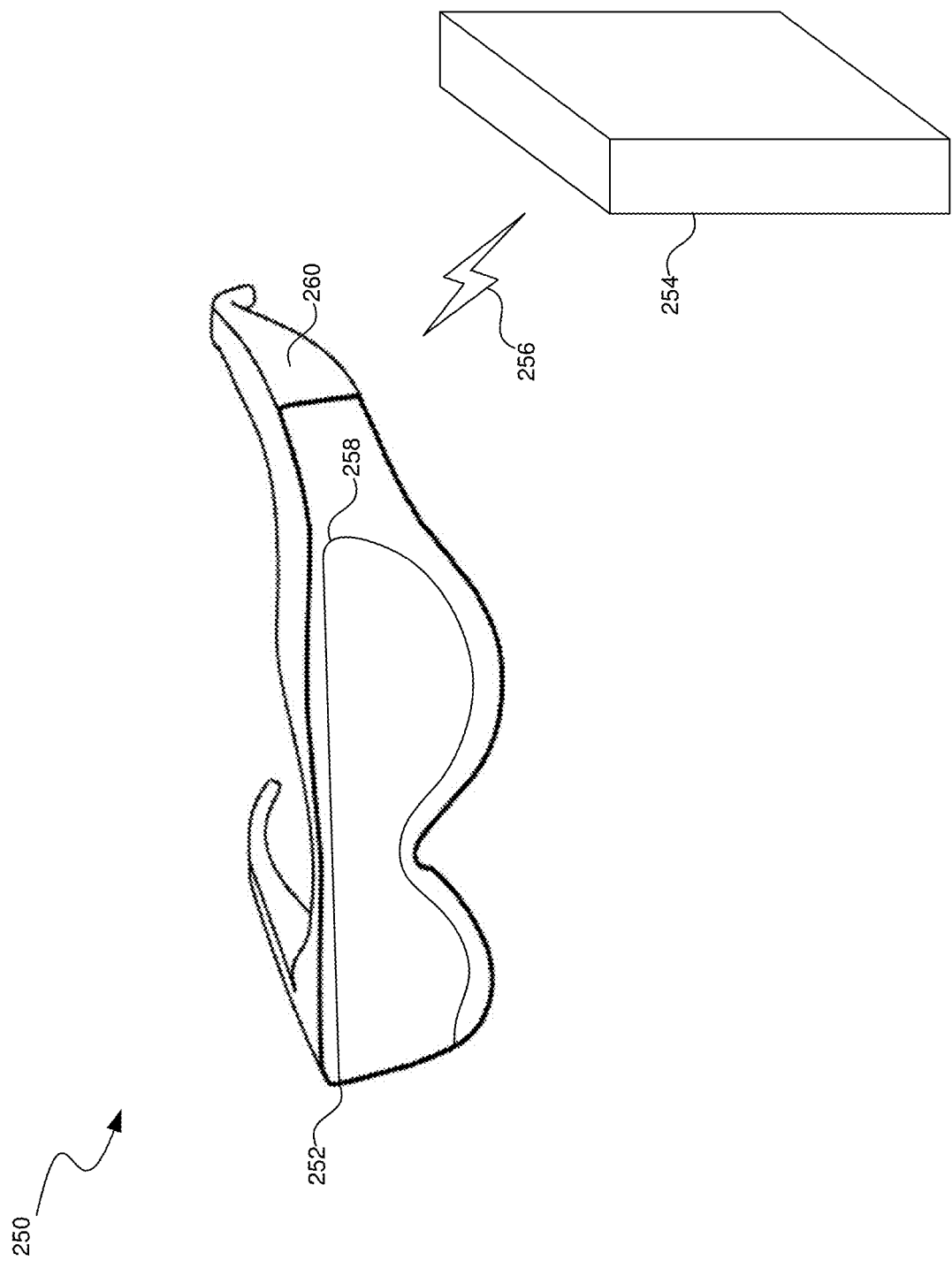
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 2C:
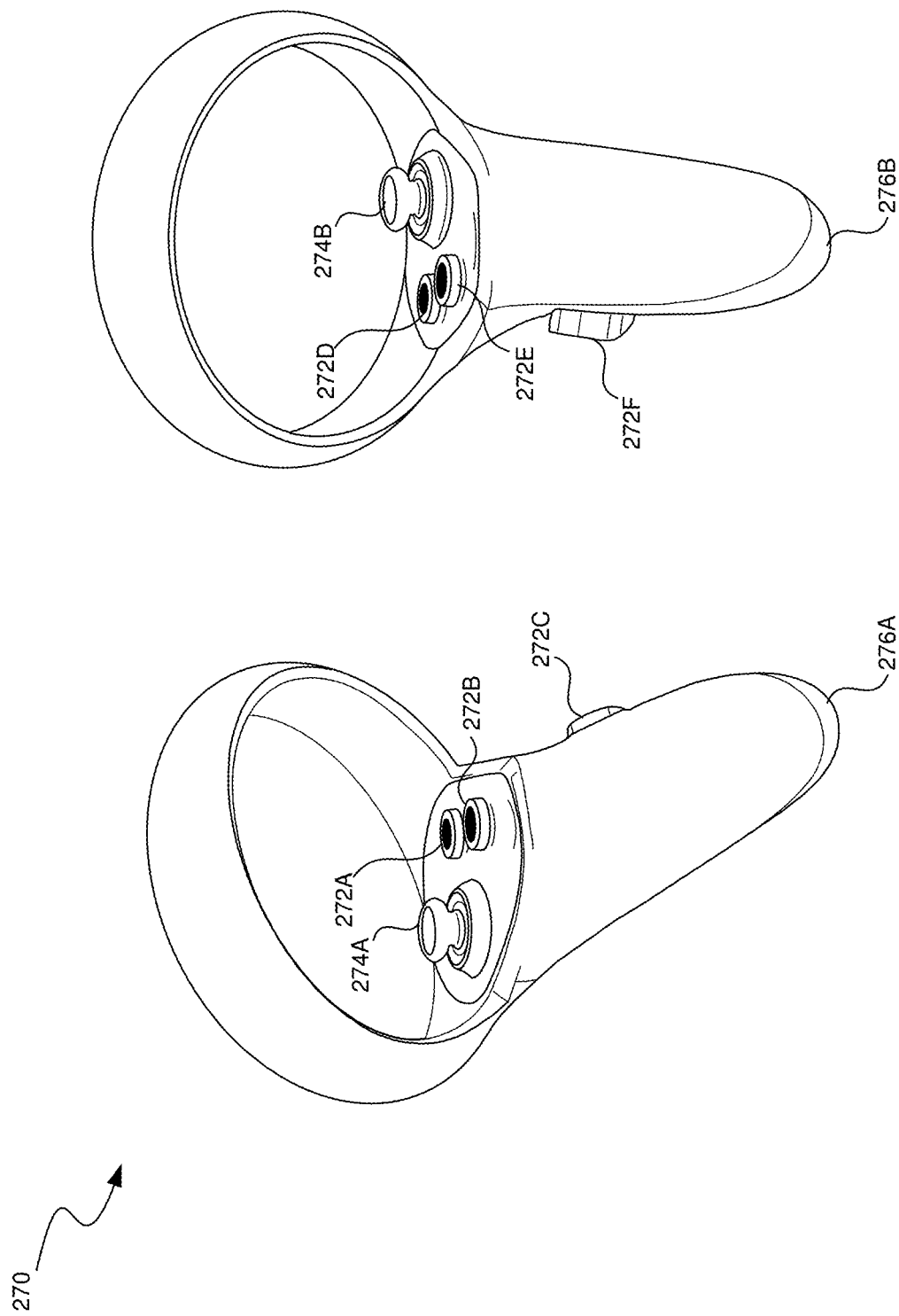
FIG. 2C is a wire diagram illustrating controllers which, in some implementations, a user can hold in one or both hands to interact with an artificial reality environment.

FIG. 2C illustrates controllers 270 (including controller 276A and 276B), which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc., to monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions. As another example, one or more light sources can illuminate either or both of the user's eyes and the HMD 200 or 250 can use eye-facing cameras to capture a reflection of this light to determine eye position (e.g., based on set of reflections around the user's cornea), modeling the user's eye and determining a gaze direction.

Figure 3:
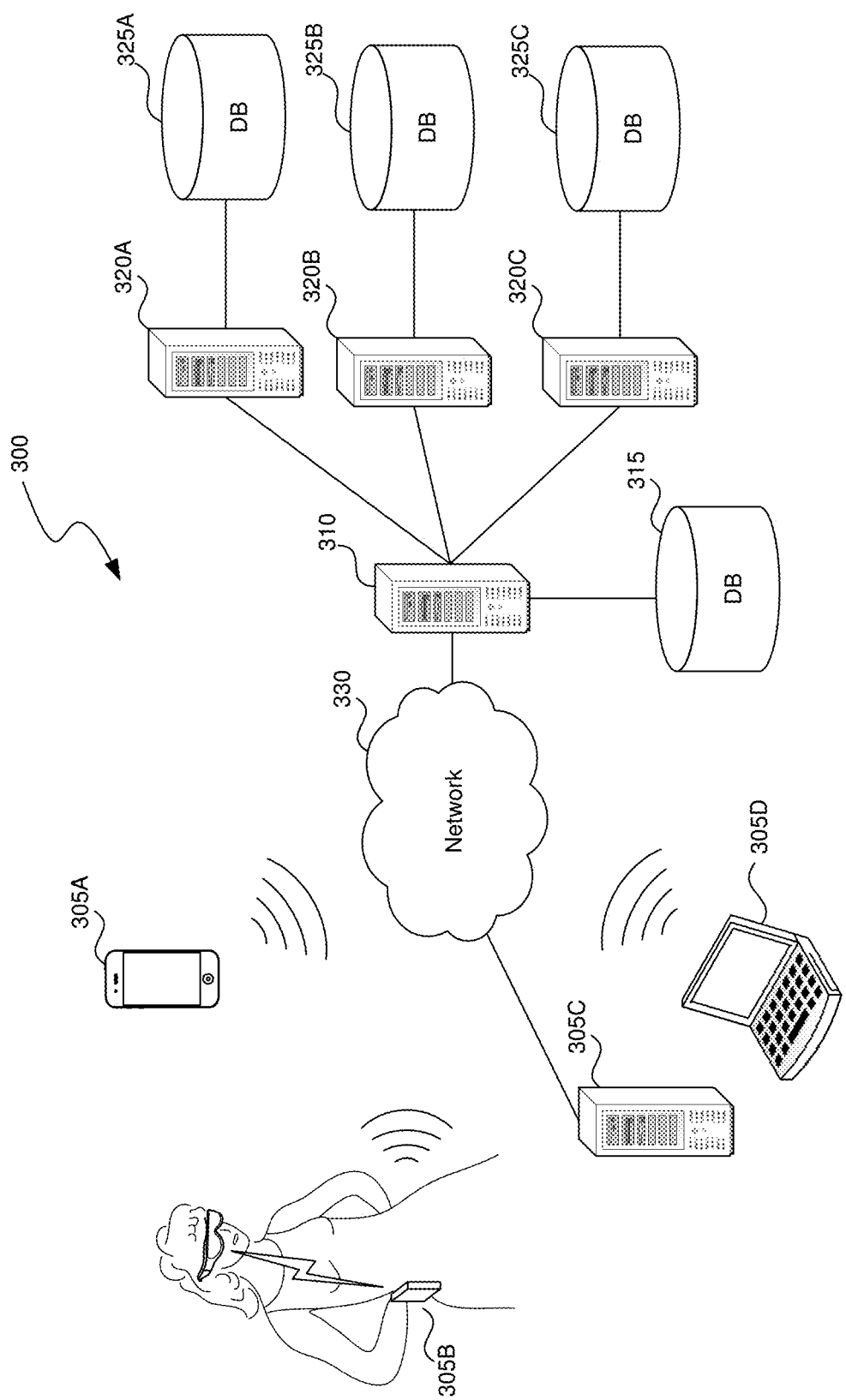
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
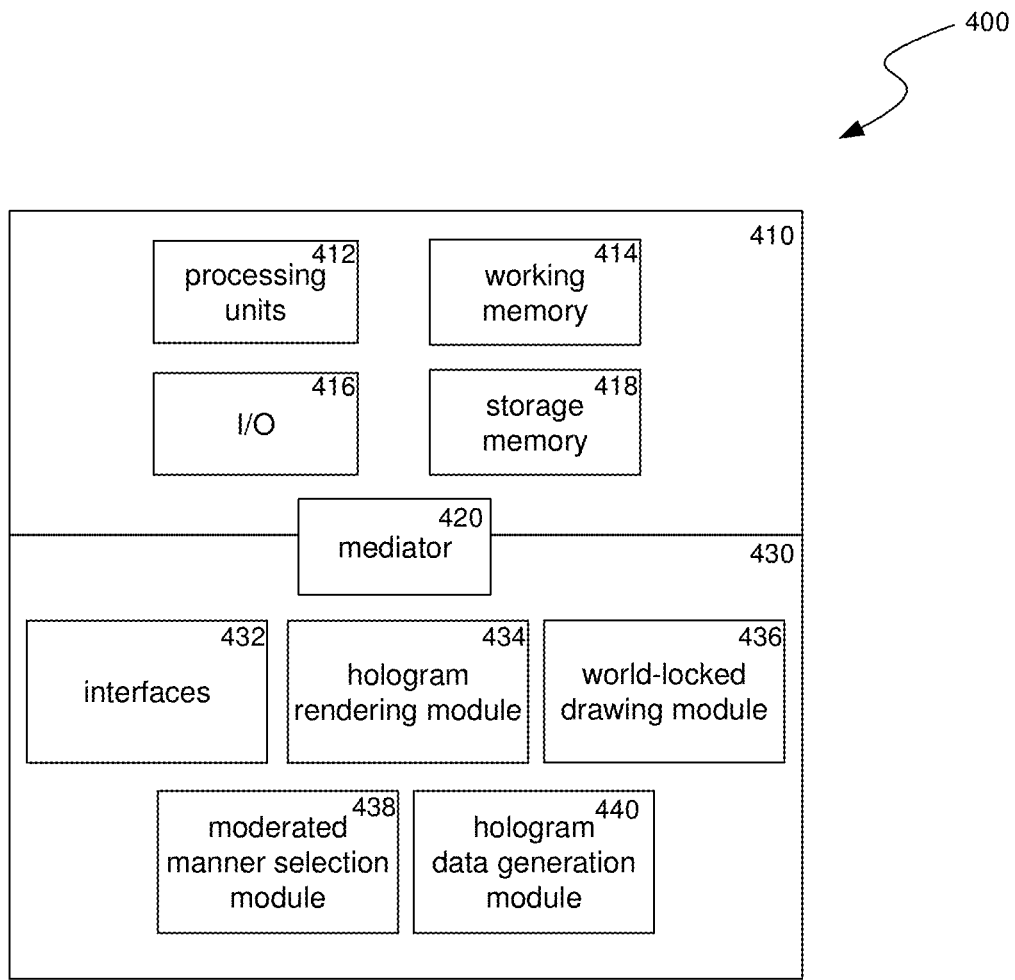
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for controlling an augmented call based on user gaze. Specialized components 430 can include hologram rendering module 434, world-locked drawing module 436, moderated manner selection module 438, hologram data generation module 440, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

Hologram rendering module 434 can obtain a hologram representing a receiving call recipient in an augmented call. Hologram rendering module 434 can further render the hologram representing the receiving call participant on one or more devices of computing system 100 at a world-locked location established for the receiving call participant. Additional details regarding obtaining the hologram are described herein with respect to block 502 of FIG. 5.

World-locked drawing module 436 can draw the hologram representing the receiving call participant relative to a tracked geographical point even as the artificial reality device moves. Thus, world-locked drawing module 436 can use photo tracking and other means of determining the relative position of the artificial reality device to the geographical position and, as the artificial reality device moves, can repeatedly update the hologram presentation to appear as if it's staying in the same location. Additional details regarding world-locked drawing are described herein with respect to FIG. 6.

Moderated manner selection module 438 can receive, over a communication channel (such as network 330), an indication that a gaze of the receiving call participant or an indication of whether the gaze of the receiving call participant is focused on a representation of the sending call participant, as detected on the receiving side of the augmented call. The representation can be, for example, a hologram. Moderated manner selection module 438 can further select a moderated manner for capturing or generating hologram data representing the sending call participant based on a determination (from the indication) that the gaze of the receiving call participant is not focused on the representation of the sending call participant. The moderated manner can be, for example, at least one of reduced frame rate, two-dimensional rendering, reduced resolution, dimming, desaturating, pausing capture, foveating, blurring, or selecting a lower power capture device, or any combination thereof. Additional details regarding selecting a moderated manner are described herein with respect to block 506 of FIG. 5.

In some implementations, moderated manner selection module 438 can receive an indicator that the representation of the sending call participant is outside of a field-of-view of the receiving call participant based on the gaze of the receiving call participant. In such implementations, moderated manner selection module 438 can pause capture or generation of the hologram data, such as by turning off one of more capture devices on the sending side, such as a camera, pausing execution of a machine learning model or algorithm used in hologram capture, etc.

In some implementations, the selected moderated manner specifies a second quality different from a first quality specified when the gaze of the receiving call participant is focused on the representation of the sending call participant. In such implementations, the hologram data generated with the second quality can require one or both of (A) less bandwidth to transmit or (B) less computing resources to create and/or render, than hologram data generated with the first quality.

Hologram data generation module 440 can capture or generate, according to the moderated manner selected by moderated manner selection module 438, the hologram data representing the sending call participant. The hologram data can include, for example, RGB and depth data needed to render a hologram of the sending call participant. Hologram data generation module 440 can further facilitate transmission of the hologram data representing the sending call participant to the receiving system. In response to receiving the hologram data representing the sending call participant, the receiving system can display a moderated representation of the sending call participant. Additional details regarding capturing or generating hologram data is described herein with respect to block 510 of FIG. 5.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
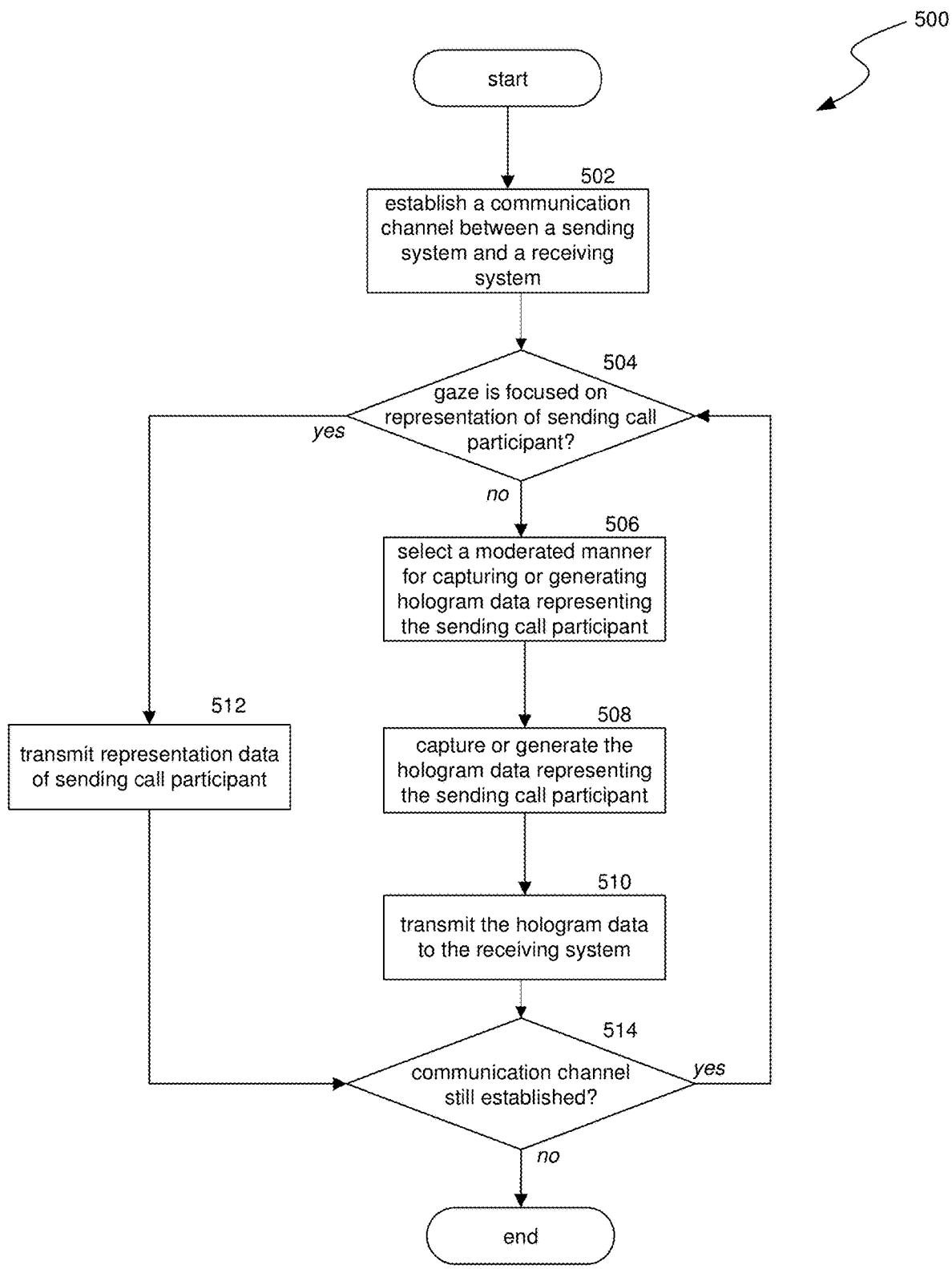
FIG. 5 is a flow diagram illustrating a process used in some implementations of the present technology for controlling a sending side of an augmented call based on a gaze detected on a receiving side of the augmented call.

FIG. 5 is a flow diagram illustrating a process 500 used in some implementations for controlling a sending side of an augmented call based on a gaze detected on a receiving side of the augmented call. In some implementations, process 500 can be performed as a response to a user initiating an augmented call. It is contemplated that process 500 can be performed once, or repeated throughout an augmented call until the augmented call is terminated, as described herein. In some implementations, multiple instances of process 500 can be run in parallel, such as for multiple receiving call participants, as described further herein. In some implementations, process 500 can be performed by a sending system, such as a sending system including hologram data moderation system 104 of FIG. 1 described herein.

At block 502, process 500 establishes a communication channel between a sending system associated with a sending call participant and a receiving system associated with a receiving call participant. In some implementations, the sending call participant can be the participant speaking on the augmented call. Process 500 can establish the communication channel over a network, such as network 330 described with respect to FIG. 3. The communication channel can be a real-time communication (RTC) channel that uses known technologies to facilitate low latency data transfer for the augmented call. The RTC channel can implement various encoding/decoding algorithms, compression/decompression algorithms, delivery or latency guarantees, security features, routing and transport algorithms, etc. In some implementations, either or both of the sending system and the receiving system can be a mixed reality HMD system 250 described herein with respect to FIG. 2.

In some implementations, process 500 can obtain a hologram representing the receiving call participant, and display the hologram representing the receiving call participant on the sending system at a world-locked location established for the receiving call participant. Specifically, process 500 can draw the hologram representing the receiving call participant relative to a tracked geographical point even as the sending system moves. Thus, process 500 can use photo tracking and other means of determining the relative position of the sending system to the geographical position and, as the sending system moves, can repeatedly update the hologram representation to appear as if it's staying in the same location.

At block 504, process 500 determines whether the gaze of the receiving call participant is focused on a representation of the sending call participant, such as a hologram of the sending call participant displayed on the receiving system. For example, process 500 can receive an indication of the gaze of the receiving call participant as metadata over a network. In various implementations, the indication of the gaze can be an indication of where in the recipient's space the receiving user is looking, how near the sending user's hologram the recipient's gaze is focused, or simply a Boolean indicator of whether the receiving user is looking at the sending user's hologram and/or whether the sending user's hologram is in the field-of-view of the receiving user. The receiving system can generate the indication by tracking the receiving call participant's eye movement with respect to the representation of the sending call participant using a camera or other image capture device installed integrally with or proximate to the receiving system. Additional details on tracking the receiving call participant's gaze are discussed below in relation to block 606 of FIG. 6. In various cases, process 500 can determine whether the recipient user's gaze is focused on the sending caller's hologram based on a determination of whether the recipient user's gaze actually falls on the sending caller's hologram or whether the recipient user's gaze is within a threshold distance of the sending caller's hologram.

If the gaze of the receiving call participant is focused on the representation of the sending call participant, process 500 can proceed to block 512. At block 512, process 500 can continue to transmit representation data of the sending call participant that can facilitate continued rendering and display of the representation on the receiving system at a consistent quality. Process 500 then can proceed to block 514.

If the gaze of the receiving call participant is not focused on the representation of the sending call participant, process 500 can proceed to block 506. At block 506, process 500 selects a moderated manner for capturing or generating hologram data representing the sending call participant based on the indication that the gaze of the receiving call participant is not focused on the representation of the sending call participant. The moderated manner can include at least one of dimming, desaturating, reducing framerate/pausing animation, applying foveated vignette, monochrome capture, removing fills, reducing texture resolution, using imposters, reducing polygon count, applying blur, entering light or dark mode, compressing content, glinting content, degrading to bounding box, degrading to object outline, clipping the field-of-view, reducing dynamic lighting, selecting a lower power capture device, or any combination thereof.

Foveated imaging is an image processing technique in which the amount of detail varies across the image based on the fixation point of a user's gaze. Vignette is an image processing technique in which an image fades off gradually into the background. Thus, "foveated vignette," as referred to herein, describes applying image processing to the representation of the sending call participant such that the representation fades gradually from a focal point, such as the sending call participant's face, toward its edges and into the background. In some implementations, by applying foveated rendering, the representation of the sending call participant can have increased opacity or transparency toward its edges such that the representation appears to fade into the receiving call participant's real-world background. In some implementations, the representation of the sending call participant can become darker toward its edges, i.e., fading into black. By applying foveated vignette, less heat can be generated on the display of an XR system, and less processing power can be needed due to lack of detailed rendering of the sending call participant's entire representation.

An "imposter," as used herein, is a two-dimensional simplified rendering of a three-dimensional object mapped onto a rectangular card or billboard. To create an imposter, process 500 can render multiple possible perspectives of a three-dimensional representation of the sending call participant into textures onto a billboard, creating a less complex geometric representation. Because the receiving call participant is not focused on the representation of the sending call participant, the receiving call participant is unlikely to notice the imposter. Using imposters can result in the XR system using less processing power by reducing the amount of geometry that needs to be rendered.

Entering light or dark mode, as used herein, relates generally to the inversion of colors. In dark mode, process 500 can render the sending call participant in light color against a dark background. In contrast, in light mode, process 500 can render the sending call participant in dark colors against a light background. Using light or dark mode can reduce power consumption by the display on an XR device depending on the environment of the receiving call participant. For example, if the receiving call participant is in a room with high ambient light, process 500 can enter light mode and render the sending call participant in darker colors, reducing battery consumption. As another example, if the receiving call participant is looking away from the sending call participant, process 500 can enter dark mode and render the background in darker colors, also reducing battery consumption.

"Glinting content," as used herein, refers to the simplification of virtual objects. In particular, process 500 can glint the representation of the sending call participant by minimizing and replacing the three-dimensional rendering with a simplified representation—such as an icon. For example, process 500 can replace the representation of the sending call participant with an avatar bubble.

At block 508, process 500 captures or generates the hologram data representing the sending call participant according to the selected moderated manner. Specifically, process 500 can capture audio, traditional images, and/or depth images/data using one or more capture devices of the sending system according to the selected moderated manner. Process 500 can receive an instruction to start collecting captured data and, where more than one camera configuration is available, an indication of which cameras to use. Process 500 can produce the captured data (e.g., traditional images, depth images, pixel clouds, etc.) with some tagged meta-data. Process 500 can include interfacing with capture hardware to gather capture data and associate the capture data with metadata such as the time each portion of the capture data was captured and which device captured that portion of the capture data. In various implementations, the capture data can come from one or more of: a black-and-white camera, a color camera, a depth camera, a distance sensor, a microphone, etc. Cameras can be configured to capture images at different resolutions and frame rates either statically or dynamically according to the selected moderated manner. For example, the system can enable or disable cameras, change capture resolution, frame rate, audio quality, etc. based on one or more of: available bandwidth being above or below corresponding thresholds, power consumption being above or below corresponding thresholds, heat consumption being above or below corresponding thresholds, according to an ability of the receiving system to display certain types of images (e.g., display 3D images, images at different resolutions, display at various frame rates, etc.), according to user settings, according to a viewpoint of the receiving user, based on which cameras that can see at least part of the sending user, etc.

In some implementations, process 500 can perform various processes to tag the captured data with further metadata and/or remove unnecessary portions of the captured data. Process 500 can receive the captured data (tagged with the devices that captured each portion of the captured data) and calibration parameters associated with the device for which that set of parameters was created and can produce curated data, which has been filtered, enhanced, and tagged with calibration identifiers and/or other identifiers. In various implementations, the filtering can include selecting the captured data from the devices that will be used to construct images at the receiving system (e.g., images useable to construct a 3D representation from the receiver's point of view) and/or removing portions of images unnecessary for constructing the 3D representation (e.g., background or other portions of the images not depicting the sending user). In some cases, enhancing the captured data can include cross-referencing captured data from multiple capture devices to enhance image quality. For example, captured data streams from a traditional camera and a depth camera can be used to enhance one another. In some cases, where the captured data includes images from one traditional camera and data from one depth sensor, the depth sensor data can be used to assign each point in the image a depth. Where the captured data includes images from multiple traditional cameras, the images can be combined into a weighted combination, where the weights are assigned based on camera on the viewpoint with cameras having a better view of the point given greater weight. This can improve color and/or shading estimates for points in 3D space. Further, depending on the location of the traditional cameras, the system can perform stereo texturing to provide a 3D effect. In addition, where data from multiple depth sensors is included in the captured data, the system can combine this data to provide depth samples covering more of a 3D space. This can provide better volumetric reconstruction of object in the 3D space, solve occlusion issues, and smooth depth spatially and temporally. In some cases, the cross-referenced data streams can be from devices that are within a threshold distance of each other and/or the data streams can first be transformed according to the calibration parameters to compensate for distances between the capture devices. In yet further cases, the enhancing can include creating a depth image based on a traditional image, e.g., using a machine learning model trained to estimate depths based from traditional images. Process 500 can tag the captured data with the calibration parameters by matching the calibration parameters associated with the device to the captured data stream taken from that same device. Process 500 can tag the data streams with additional information such as identified objects, identified people, and corresponding locations within images for identified tags.

In some implementations, the selected moderated manner specifies a second quality different from a first quality specified when the gaze of the receiving call participant is focused on the representation of the sending call participant. In such implementations, the hologram data generated with the second quality requires one or both of (A) less bandwidth to transmit or (B) less computing resources to create and/or render, than hologram data generated with the first quality. The second quality can be a lower quality with respect to the first quality. For example, when the receiving call participant is not focused on the representation of the sending call participant, the hologram data can be generated such that the resulting hologram is displayed with a reduced framerate or paused, with glinting, with reduced texture resolution, as an imposter, and/or blurred. Such moderations can reduce the amount of bandwidth needed to transmit the hologram data to the receiving call participant, as less data is needed to render the resulting hologram on the receiving system.

In another example, when the receiving call participant is not focused on the representation of the sending call participant, the hologram data can be generated such that the resulting hologram is displayed as dimmed, with foveated vignette, with glinting, and/or degraded to outlines. Such moderations can reduce heat consumption and conserve battery power when rendered on the receiving system, as compared to an unmoderated hologram.

In some implementations, the indication can further specify that the representation of the sending call participant is outside of a field-of-view of the receiving call participant based on the gaze of the receiving call participant. In such implementations, process 500 can pause capture or generation of the hologram data. For example, the sending system can disable one or more capture cameras, pause execution of one or more machine learning models (e.g., a model used to estimate depth data for a captured RGB images or to fill-in occluded portions of the sending user), disable a encoding pipeline, etc., which can also cause the receiving system to pause decoding and rendering operations of the hologram representative of the sending call participant since it is not in view.

At block 510, process 500 can transmit the hologram data representing the sending call participant to the receiving system. Specifically, process 500 can transform curated data into a format for transmission across a network. In some implementations, this compression can be achieved by applying a video codec, such as an MPEG standard, performing entropy encoding, or applying another known lossy or lossless compression algorithm. In, some implementations, the compression algorithm used can depend on the format of the received data. For example, a point cloud data stream can be compressed using the point cloud library (PCL), the MPEG point cloud compression standard, or another point cloud compression algorithm. Similarly, other data formats can be compressed with known corresponding libraries for those data formats or generic compression algorithms can be applied. In various implementations, the compression can combine the curated data from multiple devices into a single package or can compress each data stream separately. In some cases, the compressed data can include the meta-data applied at block 506 while in other cases these tags can be provided as separate but associated compressed or uncompressed data. In some implementations, captured traditional image data and depth data for corresponding time intervals can be used to compress each other. For example, motion vectors can be determined from one stream and used to help compress the other. In some cases, the compression algorithm used, or parameters set for the compression, can be determined dynamically based on a conversation context (e.g., available bandwidth, display capabilities of receiver, compute capabilities of sender or receiver, etc.)

The receiving system, in response to receiving the hologram data representing the sending call participant, can render a moderated representation of the sending call participant. Specifically, process 500 can transform the compressed data back to a version of the original data. Process 500 can receive the compressed data (having been transmitted across a network) and can apply a reverse of the compression algorithm used to produce decompressed data. Similar to the compression process, the decompression algorithm used can depend on the type of compressed data and/or the compression algorithm used. In some implementations, factors of the decompression process can be set based on a conversation context, such as processing power or display capabilities of the receiving system.

Process 500 can create a moderated representation of the sending user (or of multiple users in the case of multiple sending systems) from depth data portion(s) of the decompressed data. The moderated representation can be in various formats such as a point cloud, a signed distance function, populated voxels, a mesh, a light field, etc. With respect to 3D representations, process 500 can accomplish transformation of the depth data into a 3D representation by using the calibration data to combine data from multiple sources and/or transform the captured data into position and contour information in 3D space. For example, each pixel in a depth image depicting a user can be transformed into a 3D representation of at least part of the user by applying transformations based on the intrinsic and extrinsic calibration parameters of the camera. The transformations can take each pixel taken at the camera location and determine a corresponding point in 3D space representing a point on the surface of the user. In some implementations, process 500 can apply the moderated manner to the representation using the hologram data and calibration data.

The receiving system can display the moderated representation of the sending call participant. For example, as described above, the moderated representation of the sending call participant can be blurred, dimmed, desaturated, foveated, etc., or any combination thereof, with respect to the representation of the sending call participant when the receiving call participant is focused on the representation.

At block 514, process 500 determines if the communication channel is still established. If the communication channel is still established, process 500 can return to block 504. If the communication channel is no longer established, i.e., the augmented call has ended, process 500 can end.

Figure 8A:
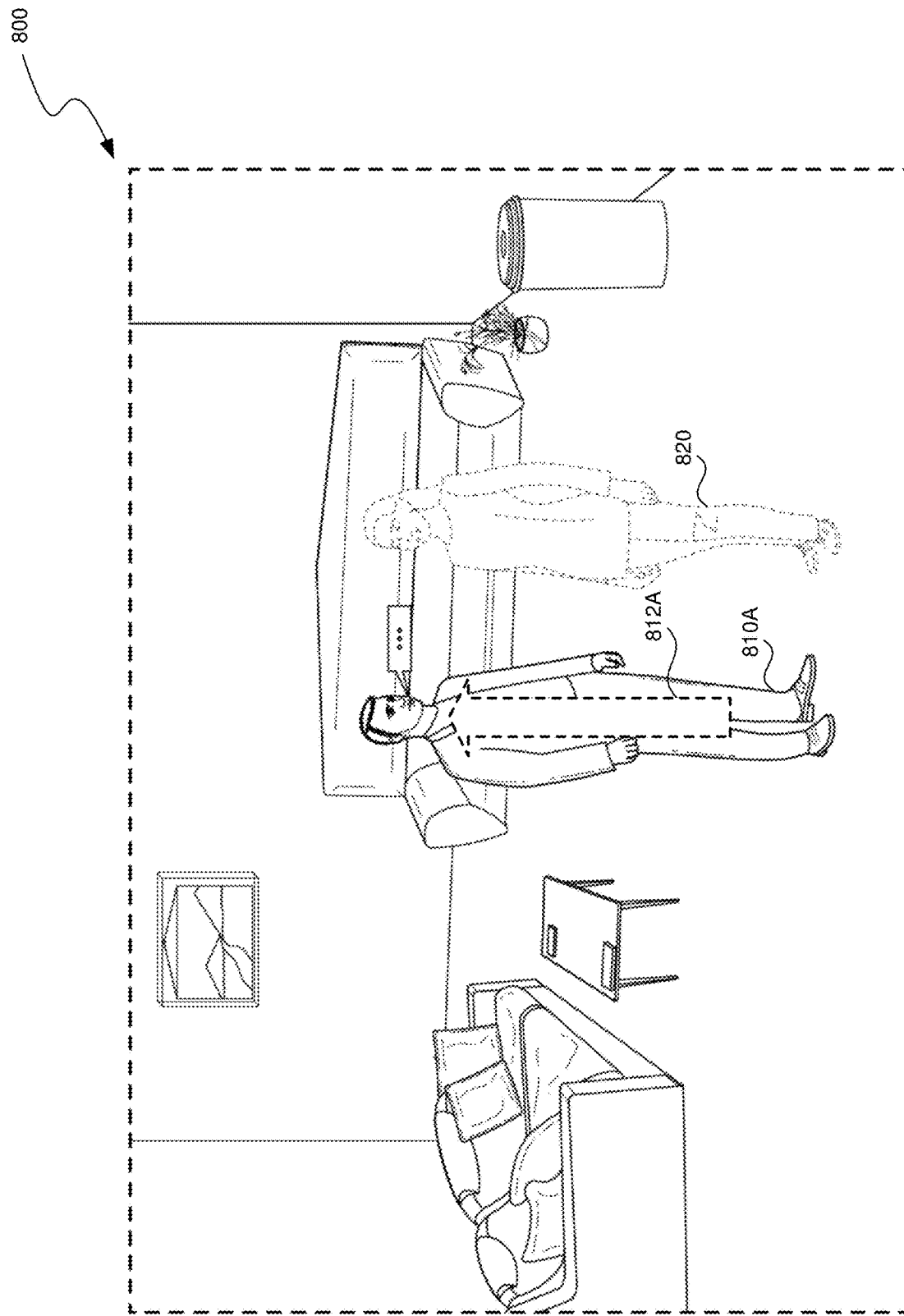
FIG. 8A is a conceptual diagram illustrating an example of a view from a receiving side of an augmented call when a receiving call participant's gaze is focused on a representation of a first sending call participant in a group augmented call.

In some implementations, and as described further herein with respect to FIGS. 8A and 8B, process 500 can be performed in parallel for multiple receiving call participants. When multiple receiving call participants are in an augmented call with the sending call participant, process 500 can generate different or the same hologram data for different receiving call participants based on their individual gazes. For example, process 500 can perform blocks 506-510 for a first receiving call participant whose gaze is not focused on the representation of the sending call participant, while process 500 can perform block 512 for a second receiving call participant whose gaze is focused on the representation of the sending call participant. In another example, process 500 can perform blocks 506-510 for both receiving call participants whose gazes are not focused on the representation of the sending call participant. In still another example, process 500 can perform block 512 for both receiving call participants whose gazes are focused on the representation of the sending call participant. In some cases, block 504 can be performed such that the "no" branch is take only when all receiving call participants' gazes are not on the hologram of the sending call participant.

Figure 6:
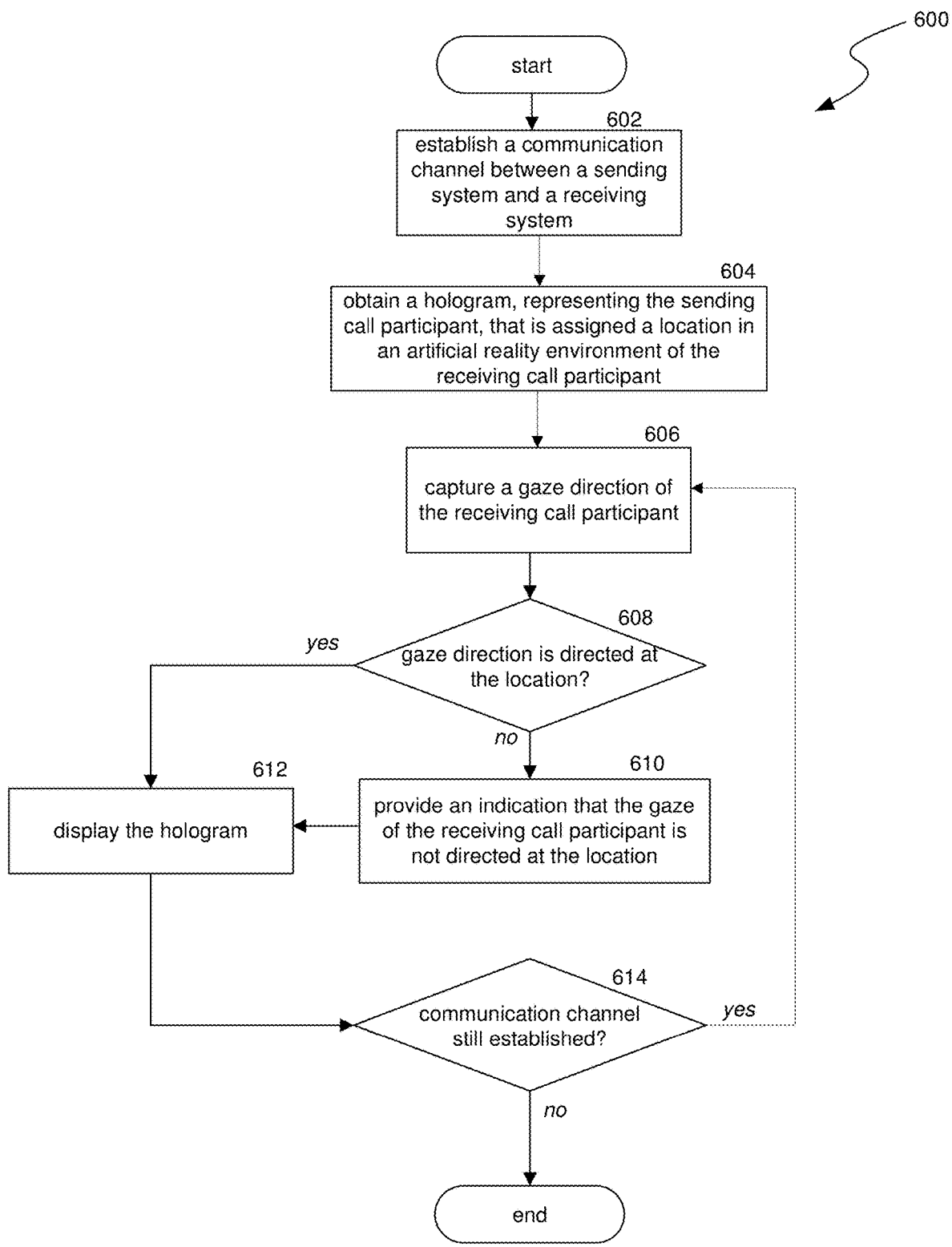
FIG. 6 is a flow diagram illustrating a process used in some implementations of the present technology for capturing receiving side gaze data for controlling a sending side of an augmented call.

FIG. 6 is a flow diagram illustrating a process 600 used in some implementations of the present technology for capturing receiving side gaze data for controlling a sending side of an augmented call. As with process 500 described with respect to FIG. 5, process 600 can be performed as a response to a user initiating an augmented call. It is contemplated that process 600 can be performed once, or repeated throughout an augmented call until the augmented call is terminated, as described herein. In some implementations, multiple instances of process 600 can be run by multiple receiving call participants. In some implementations, process 600 can be performed by a receiving system.

At block 602, process 600 can establish a communication channel between a sending system associated with a sending call participant and a receiving system associated with a receiving call participant. In some implementations, the sending call participant can be the participant speaking on the augmented call. Process 600 can establish the communication channel over a network, such as network 330 described with respect to FIG. 3. In some implementations, either or both of the sending system and the receiving system can be a mixed reality HMD system 250 described herein with respect to FIG. 2.

At block 604, process 600 can obtain a hologram representing the sending call participant that is assigned a location in an artificial reality environment of the receiving call participant. In some implementations, process 600 can assign the location based on the presence of virtual or real-world objects in the artificial reality environment, the gaze of the receiving call participant, or the field-of-view of the receiving call participant, or any combination thereof.

At block 606, process 600 can capture a gaze direction of the receiving call participant. Process 600 can capture a gaze direction of the receiving call participant using a camera or other image capture device integral with or proximate to the receiving system within image capture range of the receiving call participant. For example, process 600 can apply a light source directed to the receiving call participant's eye which causes multiple reflections around the cornea that can be captured by a camera also directed at the eye. Images from the camera can be used by a machine learning model to estimate an eye position within the user's head. In some implementations, process 600 can also track the position of the receiving call participant's head, e.g., using cameras that track the relative position of an HMD of the receiving system with respect to the world, and/or one or more sensors of an inertial measurement unit (IMU) in the HMD, such as a gyroscope and/or compass. Process 600 can then model and map the eye position and head position of the receiving call participant relative to the world to determine a vector representing the receiving call participant's gaze through the HMD.

At block 608, process 600 can determine whether the gaze direction is directed at the location assigned to the hologram representing the sending call participant. Process 600 can make this determination by detecting the direction of the eyes of the receiving call participant relative to the location of the displayed hologram. For example, process 600 can determine if the vector gaze direction passes through an area of the artificial reality device's display showing the sending user's hologram and/or can compute a distance between the point the vector gaze direction passes through the artificial reality device's display and the closest point on the display showing the sending user's hologram. If the gaze direction is directed at the location assigned to the hologram representing the sending call participant, process 600 can proceed to block 612. At block 612, process 600 displays an unmoderated hologram. Process 600 then proceeds to block 614.

If the gaze direction is not directed at the location assigned to the hologram representing the sending call participant, process 600 can proceed to block 610. At block 610, process 600 provides, to the sending system over the communication channel, an indication that the gaze of the receiving call participant is not directed at the location assigned to the hologram representing the sending call participant. The indication can be included in metadata as a flag, for example. In other implementations, instead of providing a flag, the receiving system can provide an indication of the user's gaze direction within the artificial reality environment, which the sending system can then interpret as to whether it's directed at the sending user's hologram.

In response to the indication, the sending system can select a moderated manner for capturing or generating hologram data representing the sending call participant based on the determination that the gaze direction is not directed at the location of the hologram representing the sending call participant, as described further herein with respect to process 500 of FIG. 5. For example, the sending system can capture or generate the hologram data representing the sending call participant according to a selected moderated manner. In some implementations, process 600 can receive the hologram data representing the sending call participant from the sending system and display a moderated representation of the sending call participant based on the hologram data. Process 600 then proceeds to block 612. At block 612, process 600 displays the hologram in the moderated manner according to the hologram data.

At block 614, process 600 determines if the communication channel is still established. If the communication channel is still established, process 600 can return to block 606. If the communication channel is no longer established, i.e., the augmented call has ended, process 600 can end.

Figure 7A:
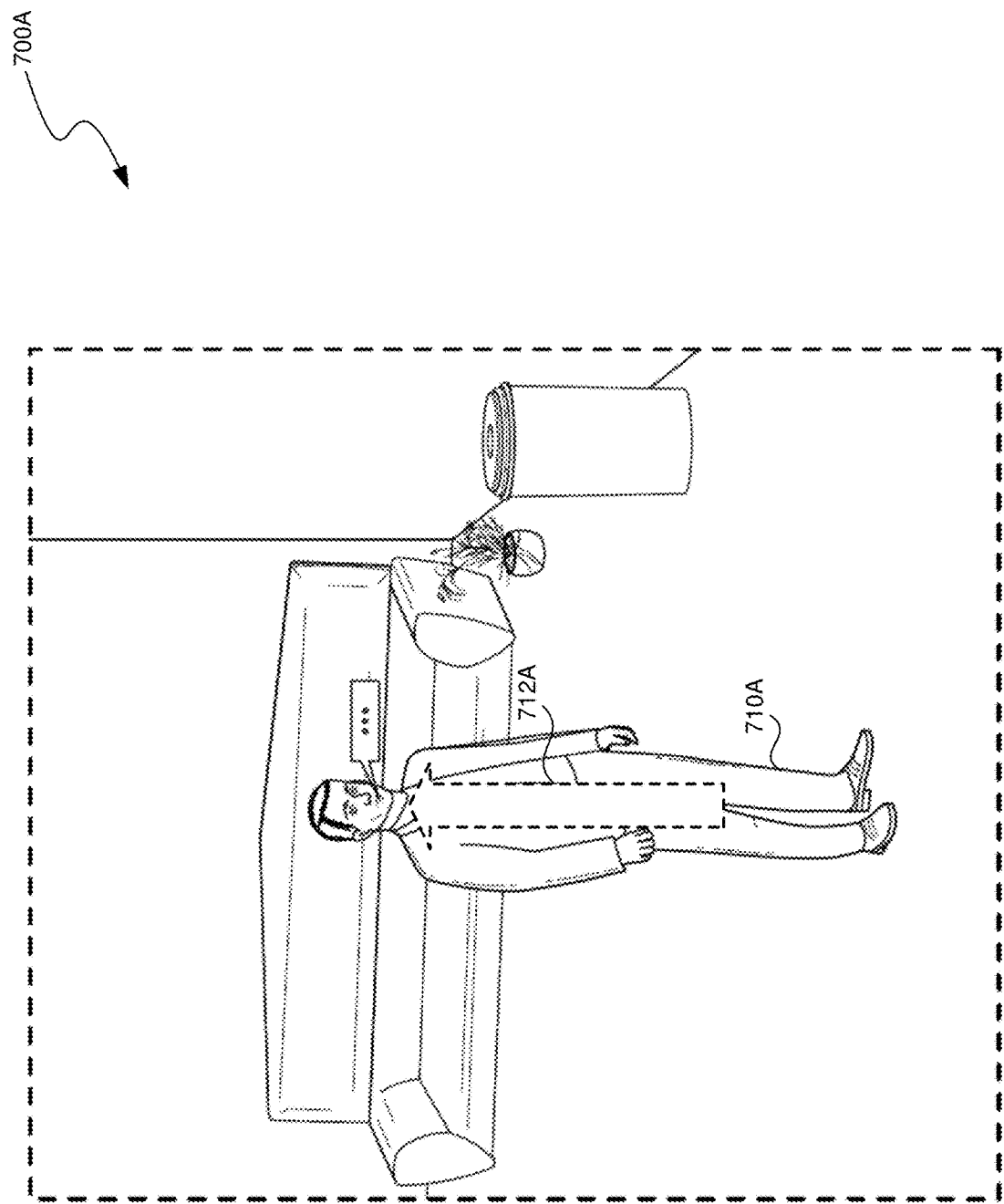
FIG. 7A is a conceptual diagram illustrating an example of a view from a receiving side of an augmented call when a receiving call participant's gaze is focused on a representation of a sending call participant.

FIG. 7A is a conceptual diagram illustrating an example of a view 700A from a receiving side of an augmented call when a receiving call participant's gaze is focused on a representation 710A of a sending call participant. View 700A can include a representation 710A of the sending call participant overlaid onto the receiving call participant's real-world room. In some implementations, the sending call participant can be speaking during the augmented call.

In view 700A, the receiving call participant's gaze 712A is focused on representation 710A of the sending call participant. Thus, representation 710A of the sending call participant can be captured and/or generated with high quality. For example, representation 710A can be three-dimensional, clear, bright, high resolution, etc.

Figure 7B:
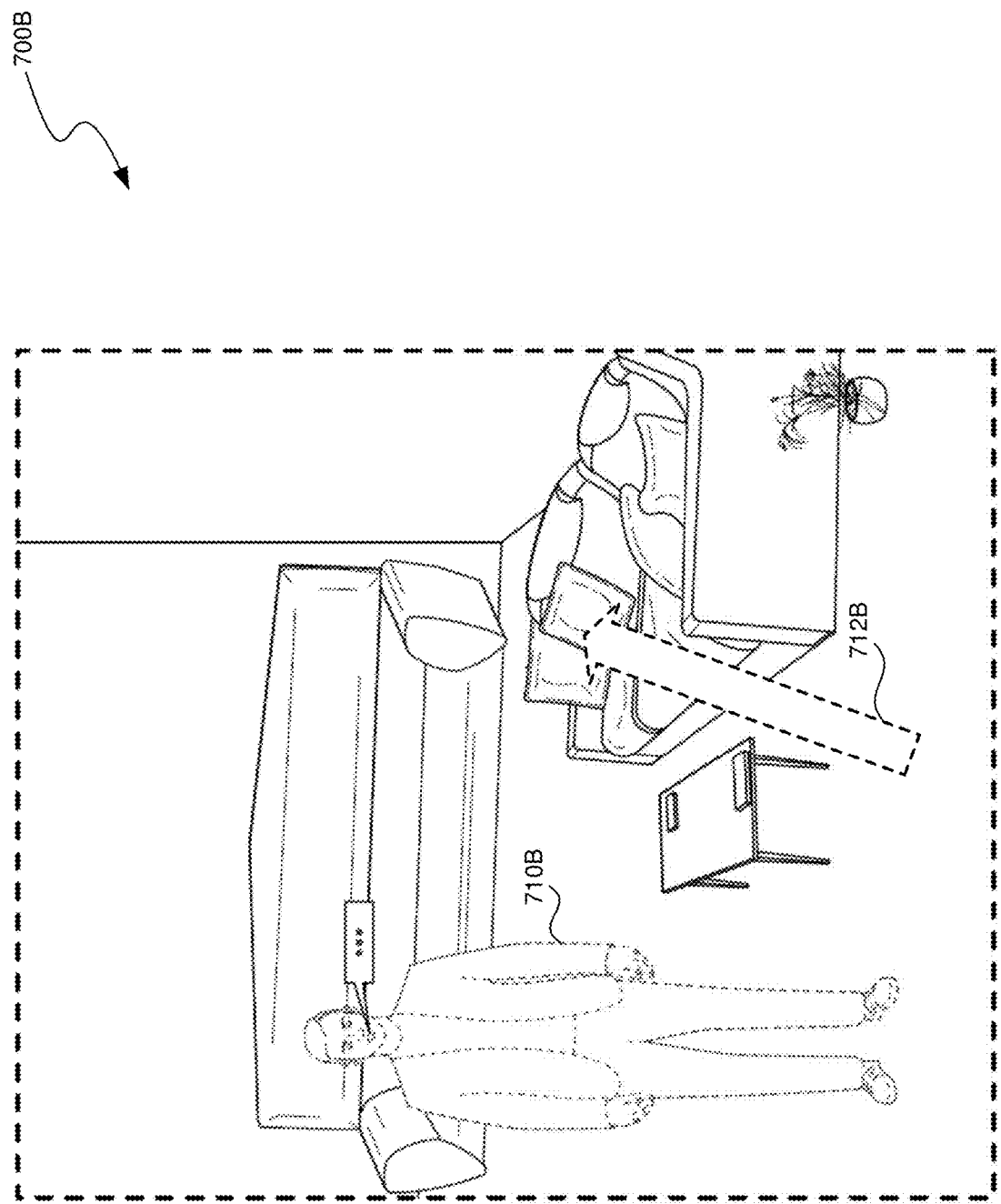
FIG. 7B is a conceptual diagram illustrating an example of a view from a receiving side of an augmented call when the receiving call participant's gaze is not focused on the representation of the sending call participant.

FIG. 7B is a conceptual diagram illustrating an example of a view 700B from a receiving side of an augmented call when the receiving call participant's gaze is not focused on the representation 710B of the sending call participant. View 700B can include a representation 710B of the sending call participant overlaid onto the receiving call participant's real-world room.

However, in view 700B, the receiving call participant's gaze 712B is focused away from representation 710B of the sending call participant. Thus, representation 710A of the sending call participant can be captured and/or generated in a moderated manner, e.g., in lower quality than in FIG. 7A, as represented by dashed lines in this example. For example, representation 710B can be two-dimensional, blurred, foveated, etc., requiring less resources to perform the augmented call, as described further herein with respect to FIG. 5.

FIG. 8A is a conceptual diagram illustrating an example of a view 800 from a first receiving side of an augmented call when a receiving call participant's gaze is focused on a representation 810A of a first sending call participant in a group augmented call. View 800 can include a representation 810A of the first sending call participant and a representation 820 of a second sending call participant overlaid onto the receiving call participant's real-world room.

In view 800, the receiving call participant's gaze 812A is focused on representation 810A of the first sending call participant. Thus, representation 810A of the first sending call participant can be captured and/or generated with high quality. For example, representation 810A can be three-dimensional, have a high frame rate, be bright, in full color, etc.

In some implementations, the first sending call participant can be speaking in the augmented call, and can have a representation 810A of higher quality than representation 820 of the second sending call participant, as represented by representation 820 being in dashed lines. However, it is contemplated that if the second sending call participant begins to speak, representation 820 of the second receiving call participant can alternatively or additionally be captured and/or generated with higher quality.

FIG. 8B is a conceptual diagram illustrating an example of a view 850 from a receiving side of an augmented call when a receiving call participant's gaze 812B is not focused on the representation 810B of a first sending call participant in a group augmented call. Representation 810B of the first sending call participant and representation 830 of a second sending call participant can be overlaid onto the receiving call participant's real-world room.

In view 850, the receiving call participant's gaze is not focused on representation 810B of the first sending call participant. Thus, representation 810B of the first sending call participant can be captured and/or generated with a moderated manner, e.g., in lower quality (as indicated by dashed lines) than in view 800, in which the first receiving call participant is focused on representation 810A. For example, representation 810B can be two-dimensional, dimmed, blurred, foveated, etc., requiring less resources to perform the augmented call.

Although the gaze of the receiving call participant is focused on representation 830 of the second sending call participant, representation 830 can have a lower quality because the second sending call participant is not speaking. However, it is contemplated that if the second sending call participant begins to speak, representation 830 of the second sending call participant can alternatively or additionally be captured and/or generated with high quality. In some implementations, however, representation 830 of the second sending call participant can be captured and/or generated with high quality regardless of whether the first receiving call participant is speaking, based on the gaze of the receiving call participant.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for controlling a sending side of an augmented call based on a gaze detected on a receiving side of the augmented call, the method comprising:
    establishing a communication channel between a sending system associated with a sending call participant and a receiving system associated with a receiving call participant;
    obtaining a hologram representing the receiving call participant;
    displaying the hologram representing the receiving call participant on the sending system at a world-locked location established for the receiving call participant;
    receiving, over the communication channel, an indication that the gaze of the receiving call participant is not focused on a representation of the sending call participant;
    selecting a moderated manner for capturing or generating hologram data representing the sending call participant based on the indication that the gaze is not focused on the representation of the sending call participant;
    capturing or generating, according to the selected moderated manner, the hologram data representing the sending call participant; and
    transmitting the hologram data representing the sending call participant to the receiving system, wherein the receiving system, in response to receiving the hologram data representing the sending call participant, displays a moderated representation of the sending call participant.

2. The method of claim 1,
    wherein the selected moderated manner specifies a second quality different from a first quality specified when the gaze of the receiving call participant is focused on the representation of the sending call participant, and
    wherein the hologram data generated with the second quality requires one or both of less bandwidth to transmit or less computing resources to create or render than hologram data generated with the first quality.

3. The method of claim 1, wherein the selected moderated manner includes at least one of reducing a frame rate, two-dimensional rendering, reducing a resolution, dimming, desaturating, pausing capture, foveating, blurring, selecting a lower power capture device, or any combination thereof.

4. The method of claim 1, wherein the indication is a first indication and wherein the method further comprises:
    receiving a second indication specifying that the representation of the sending call participant is outside of a field-of-view of the receiving call participant, and
    in response to the second indication, pausing capture or generation of the hologram data.

5. The method of claim 1, wherein the receiving system is a first receiving system, the receiving call participant is a first receiving call participant, and the hologram data is first hologram data:
    wherein the establishing the communication channel includes establishing the communication channel between the sending system, the first receiving system, and a second receiving system associated with a second receiving call participant,
    wherein the method further includes receiving, over the communication channel, an indicator that the gaze of the second receiving call participant is focused on the representation of the sending call participant, and
    wherein the sending system, in response to the indicator, transmits second hologram data generated without the moderated manner.

6. The method of claim 1, wherein the moderated manner includes pausing execution of a machine learning model used to capture the hologram data.

7. A non-transitory computer-readable storage medium storing instructions that, when executed by a computing system, cause the computing system to perform a process for controlling a sending side of an augmented call based on a gaze detected on a receiving side of the augmented call, the process comprising:
    establishing a communication channel between a sending system associated with a sending call participant and a receiving system associated with a receiving call participant;
    receiving, over the communication channel, an indication that the gaze of the receiving call participant is not focused on a representation of the sending call participant;
    selecting a moderated manner for capturing or generating hologram data representing the sending call participant based on the indication that the gaze is not focused on the representation of the sending call participant;
    capturing or generating, according to the selected moderated manner, the hologram data representing the sending call participant; and
    transmitting the hologram data representing the sending call participant to the receiving system, wherein the receiving system, in response to receiving the hologram data representing the sending call participant, displays a moderated representation of the sending call participant.

8. The non-transitory computer-readable storage medium of claim 7, wherein the process further comprises:
    obtaining a hologram representing the receiving call participant; and
    displaying the hologram representing the receiving call participant on the sending system at a world-locked location established for the receiving call participant.

9. The non-transitory computer-readable storage medium of claim 7,
    wherein the selected moderated manner specifies a second quality different from a first quality specified when the gaze of the receiving call participant is focused on the representation of the sending call participant, and wherein the hologram data generated with the second quality requires one or both of less bandwidth to transmit or less computing resources to create or render than hologram data generated with the first quality.

10. The non-transitory computer-readable storage medium of claim 7, wherein the selected moderated manner includes at least one of reducing a frame rate, two-dimensional rendering, reducing a resolution, dimming, desaturating, pausing capture, foveating, blurring, selecting a lower power capture device, or any combination thereof.

11. The non-transitory computer-readable storage medium of claim 7, wherein the indication is a first indication and wherein the process further comprises:
receiving a second indication specifying that the representation of the sending call participant is outside of a field-of-view of the receiving call participant, and
in response to the second indication, pausing capture or generation of the hologram data.

12. The non-transitory computer-readable storage medium of claim 7,
wherein the receiving system is a first receiving system, the receiving call participant is a first receiving call participant, and the hologram data is first hologram data;
wherein the establishing the communication channel includes establishing the communication channel between the sending system, the first receiving system, and a second receiving system associated with a second receiving call participant;
wherein the process further includes receiving, over the communication channel, an indicator that the gaze of the second receiving call participant is focused on the representation of the sending call participant, and
wherein the sending system, in response to the indicator, transmits second hologram data generated without the moderated manner.

13. The non-transitory computer-readable storage medium of claim 7, wherein the moderated manner includes pausing execution of a machine learning model used to capture the hologram data.

14. A computing system for controlling a sending side of an augmented call based on a gaze detected on a receiving side of the augmented call, the computing system comprising:
one or more processors; and
one or more memories storing instructions that, when executed by the one or more processors, cause the computing system to perform a process comprising:
establishing a communication channel between a sending system associated with a sending call participant and a receiving system associated with a receiving call participant;
receiving, over the communication channel, an indication that the gaze of the receiving call participant is not focused on a representation of the sending call participant;
selecting a moderated manner for capturing or generating hologram data representing the sending call participant based on the indication that the gaze is not focused on the representation of the sending call participant;
capturing or generating, according to the selected moderated manner, the hologram data representing the sending call participant; and
transmitting the hologram data representing the sending call participant to the receiving system, wherein the receiving system, in response to receiving the hologram data representing the sending call participant, displays a moderated representation of the sending call participant.

15. The computing system of claim 14, wherein the process further comprises:
obtaining a hologram representing the receiving call participant; and
displaying the hologram representing the receiving call participant on the sending system at a world-locked location established for the receiving call participant.

16. The computing system of claim 14,
wherein the selected moderated manner specifies a second quality different from a first quality specified when the gaze of the receiving call participant is focused on the representation of the sending call participant, and
wherein the hologram data generated with the second quality requires one or both of less bandwidth to transmit or less computing resources to create or render than hologram data generated with the first quality.

17. The computing system of claim 14, wherein the selected moderated manner includes at least one of reducing a frame rate, two-dimensional rendering, reducing a resolution, dimming, desaturating, pausing capture, foveating, blurring, selecting a lower power capture device, or any combination thereof.

18. The computing system of claim 14, wherein the indication is a first indication and wherein the process further comprises:
receiving a second indication specifying that the representation of the sending call participant is outside of a field-of-view of the receiving call participant; and
in response to the second indication, pausing capture or generation of the hologram data.

19. The computing system of claim 14,
wherein the receiving system is a first receiving system, the receiving call participant is a first receiving call participant, and the hologram data is first hologram data;
wherein the establishing the communication channel includes establishing the communication channel between the sending system, the first receiving system, and a second receiving system associated with a second receiving call participant;
wherein the process further includes receiving, over the communication channel, an indicator that the gaze of the second receiving call participant is focused on the representation of the sending call participant; and
wherein the sending system, in response to the indicator, transmits second hologram data generated without the moderated manner.

20. The computing system of claim 14, further comprising:
one or more capture devices,
wherein the one or more capture devices are configured to capture the hologram data.

* * * * *